(12) United States Patent
Kirkham (10) Patent No.: US 11,529,695 B2
(45) Date of Patent: Dec. 20, 2022

(54) BRAZING A HEAT EXCHANGER WITH A MOVING BRAZING TOOL

(71) Applicant: ALERIS ROLLED PRODUCTS GERMANY GMBH, Koblenz (DE)

(72) Inventor: Steven Kirkham, Mansbach-Baumbach (DE)

(73) Assignee: NOVELIS KOBLENZ GMBH, Koblenz (DE)

(*) Notice: Subject to any disclaimer, the term of this patent is extended or adjusted under 35 U.S.C. 154(b) by 209 days.

(21) Appl. No.: 16/302,929

(22) PCT Filed: May 5, 2017

(86) PCT No.: PCT/EP2017/060743
§ 371 (c)(1),
(2) Date: Nov. 19, 2018

(87) PCT Pub. No.: WO2017/198476
PCT Pub. Date: Nov. 23, 2017

(65) Prior Publication Data
US 2019/0217409 A1     Jul. 18, 2019

(30) Foreign Application Priority Data

May 20, 2016    (EP) .................................. 16170666

(51) Int. Cl.
*B23K 1/00*     (2006.01)
*B23P 15/26*     (2006.01)
(Continued)

(52) U.S. Cl.
CPC ............ *B23K 1/0012* (2013.01); *B23K 1/002* (2013.01); *B23K 1/008* (2013.01); *B23K 3/087* (2013.01);
(Continued)

(58) Field of Classification Search
CPC ..... F28F 2275/045; B21D 53/02; B23P 15/26; B23K 1/0012
(Continued)

(56) References Cited

U.S. PATENT DOCUMENTS 3,726,466 A * 4/1973 Vedder ................... B23K 1/008
                                                            228/44.3
3,747,199 A * 7/1973 Swaney, Jr. ............. B23K 1/19
                                                              228/231
(Continued)

FOREIGN PATENT DOCUMENTS

CA    2157224 A1    3/1996
CN    1736646      2/2006
(Continued)

OTHER PUBLICATIONS

Chinese Application No. 201780031116.3, Office Action, dated Dec. 16, 2020, 16 pages.
(Continued)

*Primary Examiner* — Erin B Saad
*Assistant Examiner* — Carlos J Gamino
(74) *Attorney, Agent, or Firm* — Kilpatrick Townsend & Stockton LLP (57) ABSTRACT

A method and apparatus for manufacturing a brazed heat exchanger. The method includes the steps of: assembling the heat exchanger components to form at least one unbrazed heat exchanger core in a core builder machine; without removing the at least one heat exchanger core from the core builder machine, enclosing the heat exchanger core with a brazing tool arrangement adapted to form a chamber, optionally, evacuating the chamber and/or filling the chamber with a controlled atmosphere; brazing the heat exchanger core in the chamber to form a brazed heat exchanger.

10 Claims, 5 Drawing Sheets

(51) Int. Cl.
*B23K 1/008* (2006.01)
*B23K 3/08* (2006.01)
*B23K 1/002* (2006.01)
*F28D 7/00* (2006.01)
*F28F 1/12* (2006.01)
*F28F 9/02* (2006.01)
*B23K 101/14* (2006.01)
*B23K 103/10* (2006.01)
*F28D 1/053* (2006.01)

(52) U.S. Cl.
CPC ............ *B23P 15/26* (2013.01); *F28D 7/0066* (2013.01); *F28F 1/12* (2013.01); *F28F 9/02* (2013.01); *B23K 2101/14* (2018.08); *B23K 2103/10* (2018.08); *F28D 1/05316* (2013.01); *F28F 2275/045* (2013.01)

(58) Field of Classification Search
USPC .......................................................... 29/54
See application file for complete search history.

(56) References Cited

U.S. PATENT DOCUMENTS

| | | | | |
|---|---|---|---|---|
| 3,941,293 | A * | 3/1976 | Chartet | B23K 1/0012 228/44.3 |
| 4,087,996 | A * | 5/1978 | Paille | B21K 3/04 72/364 |
| 4,321,739 | A | 3/1982 | Martin et al. | |
| 4,496,818 | A * | 1/1985 | Reynolds | B23K 1/002 219/635 |
| 5,206,990 | A * | 5/1993 | Wright | B21D 53/08 29/726 |
| 5,549,238 | A * | 8/1996 | Hindle | B23K 1/0012 228/183 |
| 5,956,846 | A * | 9/1999 | Ross | F28D 1/05383 29/890.043 |
| 5,971,258 | A * | 10/1999 | Eichhorn | B32B 15/016 148/528 |
| 6,067,704 | A | 5/2000 | Warren et al. | |
| 6,108,899 | A | 8/2000 | Piccirilli | |
| 6,152,353 | A * | 11/2000 | Sani-Bakhtiari | B23K 3/00 228/180.1 |
| 6,332,266 | B1 * | 12/2001 | Park | B23P 15/26 29/726 |
| 6,913,184 | B2 * | 7/2005 | Dockus | B23K 35/002 228/56.3 |
| 8,205,784 | B1 * | 6/2012 | Oosthuysen | B23K 5/006 228/43 |
| 8,434,658 | B2 * | 5/2013 | Ishikawa | H05K 3/341 228/103 |
| 8,960,522 | B2 * | 2/2015 | Taras | B23K 3/043 228/43 |
| 2003/0000936 | A1 * | 1/2003 | Kim | C30B 25/10 219/390 |
| 2003/0201302 | A1 * | 10/2003 | Tonjes | B23K 1/0012 228/10 |
| 2005/0064226 | A1 * | 3/2005 | Benedictus | B32B 15/016 428/654 |
| 2005/0079376 | A1 * | 4/2005 | Benedictus | B23K 1/0012 428/654 |
| 2010/0139094 | A1 * | 6/2010 | Branyon | B23K 1/00 29/890.043 |
| 2011/0204124 | A1 * | 8/2011 | Wittebrood | B23K 1/0012 228/219 |
| 2015/0247671 | A1 * | 9/2015 | Steinlage | F27B 5/04 219/653 |
| 2016/0175957 | A1 * | 6/2016 | Iijima | B23K 1/19 228/199 |
| 2016/0288270 | A1 * | 10/2016 | Knutsson | B22F 1/0062 |
| 2019/0128616 | A1 * | 5/2019 | Wanke | F28F 3/025 |

FOREIGN PATENT DOCUMENTS

| | | |
|---|---|---|
| CN | 1777787 | 5/2006 |
| CN | 101318245 | 12/2008 |
| CN | 104588895 | 5/2015 |
| CN | 104625694 | 5/2015 |
| JP | 2004042055 | 2/2004 |
| JP | 2012159218 | 8/2012 |
| WO | 0238326 A2 | 5/2002 |

OTHER PUBLICATIONS

Chinese Application No. 201780031116.3, Office Action, dated Jul. 24, 2020, 10 pages.
International Search Report and Written Opinion dated Jul. 31, 2017 for PCT/EP2017/060743 to Aleris Rolled Products Germany GmbH filed May 5, 2017.
Chinese Application No. 201780031116.3 , Notice of Decision to Grant, dated Jun. 7, 2021, 6 pages.
Japanese Application No. 2019-513111 , Notice of Decision to Grant, dated Jun. 22, 2021, 3 pages.
Korean Application No. 10-2018-7035900 , Notice of Decision to Grant, dated Jul. 13, 2021, 2 pages.
Korean Application No. 10-2018-7035900, Office Action, dated Apr. 26, 2021, 4 pages.
Canadian Application No. 3,023,950, "Office Action", dated Oct. 7, 2022, 6 pages.

* cited by examiner

Fig. 3

PRIOR ART

BRAZING A HEAT EXCHANGER WITH A MOVING BRAZING TOOL

CROSS-REFERENCE TO RELATED APPLICATIONS

This is a § 371 National Stage Application of International Application No. PCT/EP2017/060743 filed on May 5, 2017, claiming the priority of European Patent Application No. 16170666.8 filed on May 20, 2016.

FIELD OF THE INVENTION

The present invention relates to a method and apparatus for manufacturing a brazed heat exchanger, in particular a heat exchanger made from aluminium alloy components.

BACKGROUND OF THE INVENTION

Heat exchangers made from aluminium alloy products are used widely in the transportation industries, such as the automotive industry, for powertrain cooling and HVAC& R applications, as well as for domestic and industrial cooling purposes, e.g. for fluid processing and HVAC&R applications. A brazed heat exchanger typically comprises at least one or more tank structures to hold a coolant media; a tube or header plate coupled to at least one of the said tank structures, the said header plates or tubes include a plurality of apertures; to which are connected a multiplicity of fluid-carrying tubes, mounted in a substantially parallel array, each extending substantially perpendicular from one of the said apertures in the said header plate or tube, and structured to receive the said cooling media; and a plurality of heat transfer fins, said fins being in thermal communication with said plurality of fluid carrying tubes, and structured to transfer heat away from the tubes, in order to cool said coolant media as it flows or circulates therein.

In the manufacturing process for such brazed heat exchangers, the individual components (tubes, fins and headers, etc.) or sub-assemblies are manufactured first, wherein at least some of these components are made from aluminium alloy material, clad with a filler alloy or brazing material, which allows for joining of the heat exchanger by brazing. The individual heat exchanger components are then assembled by a so-called core builder machine. This process can be manual or fully automated in operation. After assembly, a clamp or fixture or loading device is usually put on to the assembled heat exchanger components to hold the various components together, and the fixtured heat exchanger core assembly is then transferred to a brazing furnace. For the automotive industry, where large volumes and varieties of heat exchangers are required, it is not unusual to have one or more brazing furnaces being supplied by several core builder machines, assembling different types of heat exchangers.

In the prior art manufacturing process, the core building and brazing processes are separate sequential process steps, carried out in two separate machine cells or equipment layouts, requiring a number of handling and transportation steps in between the core building machine and the brazing furnace. As the heat exchangers are only loosely assembled prior to brazing, they need to be secured with a braze clamp or frame, such as disclosed for example in patent document U.S. Pat. No. 6,108,899.

An exemplary core builder machine is disclosed in patent document U.S. Pat. No. 6,067,704, and incorporated herein by reference.

It is an object of the invention to improve the efficiency and operating effectiveness of brazed heat exchanger manufacture, in particular brazed aluminium alloy heat exchanger manufacture.

It is another object of the present invention to provide a method and apparatus for manufacturing brazed heat exchangers, which uses fewer process steps, less handling operations and less work-in-progress inventories.

DESCRIPTION OF THE INVENTION

This and other objects and further advantages are met or exceeded by the present invention providing a method of manufacturing a brazed heat exchanger according to claim 1 and the corresponding apparatus according to claim 9. Preferred embodiments of the invention are described herein and set forth in the dependent claims.

As will be appreciated below, except as otherwise indicated, aluminium alloy and temper designations refer to the "International Alloy Designations and Chemical Composition Limits for Wrought Aluminum and Wrought Aluminum Alloys" in the Aluminum Standards and Data and the Registration Records, as published by The Aluminum Association in 2016 and well-known to persons skilled in the art.

For any description of alloy compositions, references to percentages are by weight percent unless otherwise indicated.

The underlying idea of the present invention is to couple the traditionally separate core building and central furnace arrangements, and allow for a fully continuous heat exchanger manufacturing cell with dedicated tooling, which comprises both the core building and brazing operations into a single integrated process. This will allow such cells or manufacturing apparatuses to be decentralized and co-located closer to the heat exchanger end-user, e.g. for automotive applications, the Original Equipment Manufacturers' (OEM's) assembly facilities, which improves just-in-time delivery and support for sequenced automotive vehicle builds.

Accordingly, the method of manufacturing a brazed heat exchanger comprises the following steps:

a. providing the components for a heat exchanger device, in particular tubes, fins, headers, side supports/members, brackets and/or mounting components, etc.;

b. assembling the heat exchanger components to form at least one unbrazed heat exchanger core in a core builder machine;

c. without removing the at least one heat exchanger core from the core builder machine, at least partially enclosing the at least one heat exchanger core with a brazing tool arrangement adapted to form a complete or partial chamber around the at least one heat exchanger core comprising means to heat the interior of the chamber;

d. optionally, at least partially evacuating the chamber and/or at least partially filling the chamber with an inert and/or a reactive gas;

e. brazing the at least one heat exchanger core in the chamber to form at least one brazed heat exchanger.

The brazing is done typically at a temperature range of 530° C. to 615° C., more typically at a temperature range of 570° C. to 610° C., e.g. at about 580° C. or about 600° C. Further, brazing is preferably done for a period long enough for melting, wetting and spreading of any brazing material or filler metal present on the heat exchanger components to join the various heat exchanger components.

Accordingly, the brazing process step is combined with the heat exchanger core building process steps. The heat exchanger components are first assembled in a core builder machine, by for example methods known in the art. At least some of the components are at least partially covered with a filler metal such as a filler alloy, a filler metal generating flux compound, or other brazing material, which is intended to melt, wet and spread upon brazing to join the heat exchanger components together. For example, at least some of the components are manufactured from aluminium alloy brazing sheet, which is clad on at least one surface with a clad layer made from filler alloy or coated with a substance to generate filler metal with temperature, or from extruded products, such as tubes, which may also be clad with a filler alloy or coated with a substance to generate filler metal with temperature.

Thereby, the assembled but unbrazed heat exchanger core or cores is/are not removed from the core builder machine prior to brazing. Rather, brazing is performed in or adjacent or in-line to the core builder machine. In this context "not removed" means that no human intervention is necessary, but that the core builder machine comprises a section (which may be integrated into typical core builder machine designs, but may also be added to a traditional or existing core builder machine), wherein the heat exchanger cores are brazed.

Accordingly, the invention does not require the typical large-scale brazing furnace, requiring significant capital investment and maintenance expenditures, as the heat required for the brazing operation is delivered locally to the assembled heat exchanger core, as part of an extended core builder process and developed core builder machine. Thus, the at least one heat exchanger is removed from the new core builder machine only after the brazing operation is complete, which avoids the need for amongst other elements braze clips and clamps and avoids any corresponding handling operations, which also offers possible cycle time per unit heat exchanger produced efficiencies and associated labour cost per unit heat exchanger benefits.

Another advantage of the invention is that dedicated production lines can be produced with associated operational and scheduling benefits. Thus, the brazed heat exchangers may be produced just-in-time, whenever and wherever they are required, without requiring intermediate storage or transportation between the core building location and the brazing operation location, and the heat exchanger manufacturing facility and the end-user facility.

By the method according to the invention, it is possible to locate these new heat exchanger manufacturing cells remotely, i.e. away from centralised braze furnace facilities, and thereby closer to the production sites where the brazed heat exchangers are required for the assembling or construction of the end products, such as for example automotive vehicles. This also allows heat exchanger production to be balanced to actual line side usage and reduces unnecessary work-in-progress inventories at various points in the complete value stream. Accordingly, the inventive method reduces or minimizes the handling costs, logistic costs and transport damage losses (due fragile heat exchanger structures) in the manufacture of brazed heat exchangers.

According to a preferred embodiment, the steps (a) to (e) are performed sequentially, for one or more heat exchanger(s) at a time, so that the process produces one or more brazed, joined or bonded heat exchanger(s) after the other.

In most embodiments, the brazing tool arrangement will be adapted to enclose one single heat exchanger core. On a less preferred basis, the core building machine might finish assembling two (or even more, e.g. three or four) heat exchanger cores, which are stacked and brazed in one chamber. Thus, at least one heat exchanger is manufactured at a time.

The brazing step will require that the at least one heat exchanger core is at least partially enclosed with the brazing tool arrangement which is adapted to form a chamber around the at least one heat exchanger core comprising means to heat the interior of the chamber. In preferred embodiments, the chamber may be airtight, to allow evacuation of the chamber and/or at least partially filling the chamber with inert gas, possibly with the addition of a reactive gas having oxygen getting or local atmosphere modifying characteristics.

The brazing tool arrangement is for example formed by one or several tooling elements. In a preferred embodiment, the chamber is formed by a part of the core builder tooling, which is for example a combination of multiple tooling elements which may be pivoted or linearly displaced from a non-operative position into a core assembly and brazing position, which encloses the heat exchanger core, and which occurs preferably as part of the typical core assembly operations.

The chamber, also called enclosure, formed by the brazing tool arrangement around the at least one heat exchanger core may be open or closed, but preferably allows the creation of a localized controlled atmosphere and/or a localized (partial or full) vacuum around the heat exchanger core. The controlled atmosphere should preferably have an oxygen content as low as reasonably possible, and is preferably below about 200 ppm, and more preferably below about 100 ppm, e.g. at 20 ppm or less. Furthermore, the controlled atmosphere should preferably be dry, meaning that the dew point is less than −40° C., and more preferably of −45° C. or lower. In preferred embodiments, the controlled atmosphere contains an inert gas such as argon or nitrogen.

The brazing step includes heating the at least one heat exchanger core in the chamber, preferably by one of inductive, radiation and/or conductive heating. Also combinations of these heating methods may be used, e.g. induction coils in the brazing tool arrangement in combination with radiators. In addition or alternatively, multiple brazing and joining approaches can be employed, for example (but not limited to) laser welding, electronic beam welding, infrared heating, diffusion bonding, and/or the use of other bonding techniques, for example (but not limited to) the use of adhesives and/or mechanical joining techniques (such as interference fitments, riveting, swaging, etc.).

Accordingly, the invention allows to integrate a variety of potential material joining technologies into the heat exchanger core assembly operation itself, e.g. induction brazing, laser welding, infrared heating, vacuum brazing, adhesive bonding, etc.

Preferably, in the core builder machine and method, the heat exchanger is assembled, positioned and clamped in a tooling fixture during the component assembly and sizing phase, and then directly brazed. Brazing is done for example by using the brazing tool arrangement chamber to pull a localized vacuum and braze via electric conductive, radiation and/or inductive heating, or by using appropriate material selection and brazing under a localized controlled atmosphere, again using targeted/local conductive, radiation and/or inductive heating. Preferably, Mg enriched AA4xxx-series filler alloys, flux-free materials and/or low melting filler metals, or similar, are used.

Preferably, the heat exchanger core is not fluxed prior to brazing, i.e. a flux-free brazing technique is used. This may require the use of special aluminium alloys in the heat exchanger components, which may be brazed without having to apply a brazing flux in order to disrupt the oxide layer during brazing. In an embodiment, the brazing core builder machine uses a reactive gas, i.e. a reactive process atmosphere gas which includes oxygen getting characteristics. Such reactive process gas may be heated.

In another embodiment, but on a less preferred basis, the core builder machine includes or allows the use of apparatus for applying a brazing flux material to the unbrazed heat exchanger core such as Nocolok®-based flux materials, e.g. a tooling arrangement including spray nozzles connected to a brazing flux material supply, with associated carriers, binders and heating controls. This arrangement can include flux soluble, high precision, micro mist type lubrication system during the component forming and core build operations. Such arrangements can also allow the use of surfactants to improve flux coverage and wetting.

According to a preferred embodiment, the heat exchanger components, if needed, are lubricated with an evaporative and/or flux soluble lubricant before assembling the heat exchanger core. Thereby, the degreasing step after component assembly, which is required in the prior art manufacturing processes, can be avoided or minimised. In some embodiments, at least a partial vacuum is created in the chamber prior to the brazing step, until a sufficient portion of the evaporated lubricant has been evacuated and filtered. Thereby, the lubricant may be removed without a separate degreasing step, simply by pulling an at least partial vacuum prior to brazing. Alternatively, removal of evaporative component lubrication could be achieved by pre-heating the assemblies in a partial atmosphere which is then evacuated and filtered.

In a preferred embodiment, at least some of the heat exchanger components are made from aluminium alloy brazing sheet including a core layer clad on one or both sides with a filler alloy or extruded tubes provided with a filler alloy. The core layer is made of an aluminium alloy selected from the AA1xxx, AA3xxx, AA5xxx, AA6xxx, AA7xxx or AA8xxx-series alloys. The filler alloy is preferably selected from the AA4xxx series.

In preferred embodiments, at least some of the heat exchanger components are manufactured from aluminium alloy brazing sheet clad with an alloy belonging to the AA4xxx series.

In another embodiment, but on a less preferred basis, the core builder brazing machine includes or allows the use of aluminium materials that contain, carry or are alloyed with fluxing materials, e.g. potassium fluoroaluminates.

In an embodiment, the brazing operation is carried out at relatively low temperatures in the range of between 530° C. and 595° C., more preferably between 550° C. and 585° C. This can be realized by the choice of the filler alloy used to clad the brazing sheet or extruded tube. For example, an AA4xxx-series aluminium alloy with 5% to 15% Si and having a purposive addition of zinc and/or copper of up to about 10% to lower the melting point of the filler alloy may be used as the cladding alloy or joining material.

The cycle time, i.e. the time needed to complete one cycle of assembling and brazing one (or in some embodiments several) heat exchanger(s), is typically between 1 and 45 minutes, more typically between 5 and 25 minutes.

The invention is also directed to an apparatus for manufacturing at least one brazed heat exchanger, comprising a core builder machine for assembling heat exchanger components, to form at least one unbrazed heat exchanger core. The core builder machine includes a brazing tool arrangement adapted to form a chamber which at least partially encloses the heat exchanger core (or cores), and means for heating the interior of the chamber up to a brazing temperature of the at least one heat exchanger core for a period long enough for melting and wetting of a filler metal or any brazing material, to join the various heat exchanger core components.

In a preferred embodiment, the means of heating is included in the brazing tool arrangement. For example, the brazing tool arrangement may comprise at least one element or chamber wall including e.g. one or more induction heaters, or other heating means such as an element or chamber wall heated by resistance heating, or the chamber may be heated with a convection heater.

In a preferred embodiment, the brazing tool arrangement or chamber enclosure may be constructed from, or require the usage of, high wear resistant, temperature resistant tooling and/or coatings, e.g. ceramic tooling elements.

According to a further embodiment, the apparatus may comprise a vacuum pump interconnected to the chamber for creating a reduced pressure or vacuum within the chamber. Such reduced pressure or vacuum is preferably suitable for a vacuum brazing process. The reduced pressure or vacuum created inside the chamber is preferably a medium to high vacuum, corresponding to 10 to $10^{-6}$ Pa.

Further, there may be an extraction system for extracting any brazing waste gases or fumes from the chamber, including relevant occupational health extraction requirements.

Alternatively or in addition thereto, the apparatus may comprise an inert and/or reactive gas supply or delivery system arranged to at least partially fill the chamber with inert gas and in some embodiments with an addition of a reactive gas, i.e. a controlled atmosphere, and/or for surrounding the heat exchanger core with inert and possibly reactive gas. Accordingly, the apparatus is suitable for conducting a brazing process under controlled atmosphere conditions, known as CAB (Controlled Atmosphere Brazing) processes. The inert gas is preferably nitrogen, but may also be argon or similar. Small additions of reactive gases with oxygen getting characteristics can be used to reduce the local oxygen content and avoid the risk of material re-oxidisation. Accordingly, the chamber formed/defined by the brazing tool arrangement is preferably sufficiently airtight, and the gas delivery system preferably includes a pressure regulator for achieving and maintaining a slight overpressure. The controlled gas atmosphere should preferably have an oxygen content as low as reasonably possible, and is preferably below about 200 ppm, and more preferably below about 100 ppm, e.g. at 20 ppm or less.

Furthermore, the controlled gas atmosphere should preferably be dry, meaning that the dew point is less than −40° C., and more preferably of −45° C. or lower.

In an embodiment, the method comprises a further step of rapid cooling of the brazed heat exchanger after brazing to a temperature below 80° C., in particular by forced air cooling. This may be realized by installing nozzles connected to a cooling air or shielding gas supply at the core builder machine.

Preferably, the apparatus is adapted for carrying out the method according to this invention. Thus, all embodiments discussed herein are applicable to both the method and the apparatus according to this invention.

DESCRIPTION OF THE DRAWINGS

The invention shall also be described with reference to the appended drawings, in which.

Similar components are designated with the same reference signs in the drawings.

Figure 1:
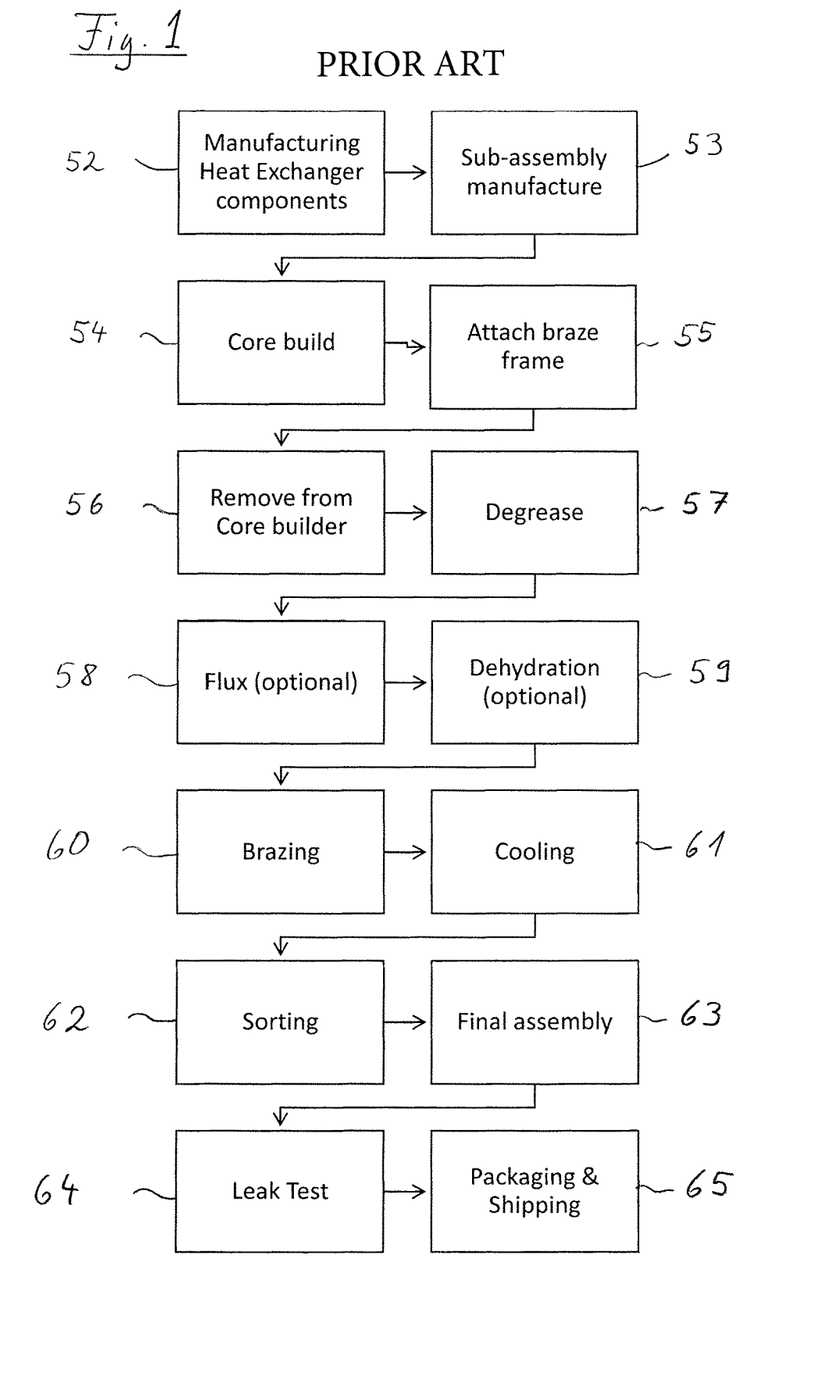
FIG. 1 shows a flow diagram of a manufacturing process for heat exchangers according to the prior art.

FIG. 1 shows an example of a process for manufacturing brazed heat exchangers according to the prior art. The individual heat exchanger components, such as tubes, fins and headers, are first manufactured in step 52, e.g. by folding or welding tubes from aluminium alloy brazing sheet or extruded tubes, and forming corrugated fins from aluminium alloy fin stock material. The individual components are then fed into a core builder machine for sub-assembly manufacture in step 53, e.g. stacking tubes and fins alternately together to form the middle part of a heat exchanger or 'core'. In step 54, the final assembly of the heat exchanger is done in the core build step. Since the assembled, unbrazed core needs to be transported to a brazing furnace, a braze frame or fixture is attached in step 55 to hold the heat exchanger core together. In step 56, the core is removed from the core builder machine, transported elsewhere and degreased (step 57), in order to remove any lubricant which was applied to the heat exchanger components in order to facilitate shaping and assembly. Optionally, a brazing flux is applied to the heat exchanger core in step 58. Further, if required, the cores may be dehydrated in step 59. Please note that steps 57-59 as well as the following brazing and cooling steps may be performed batch-wise, but also in a continuous fashion.

In step 60, the heat exchanger cores, possibly from several core builder machines, are transported to a traditionally centralised, large-scale brazing furnace and brazed, optionally followed by (forced) cooling in step 61. The brazed heat exchangers are then sorted in step 62, followed by final assembly (step 63), a leak test (step 64) and other quality control checks, further final assembly steps, and then packaging and shipping (step 65).

Figure 2:
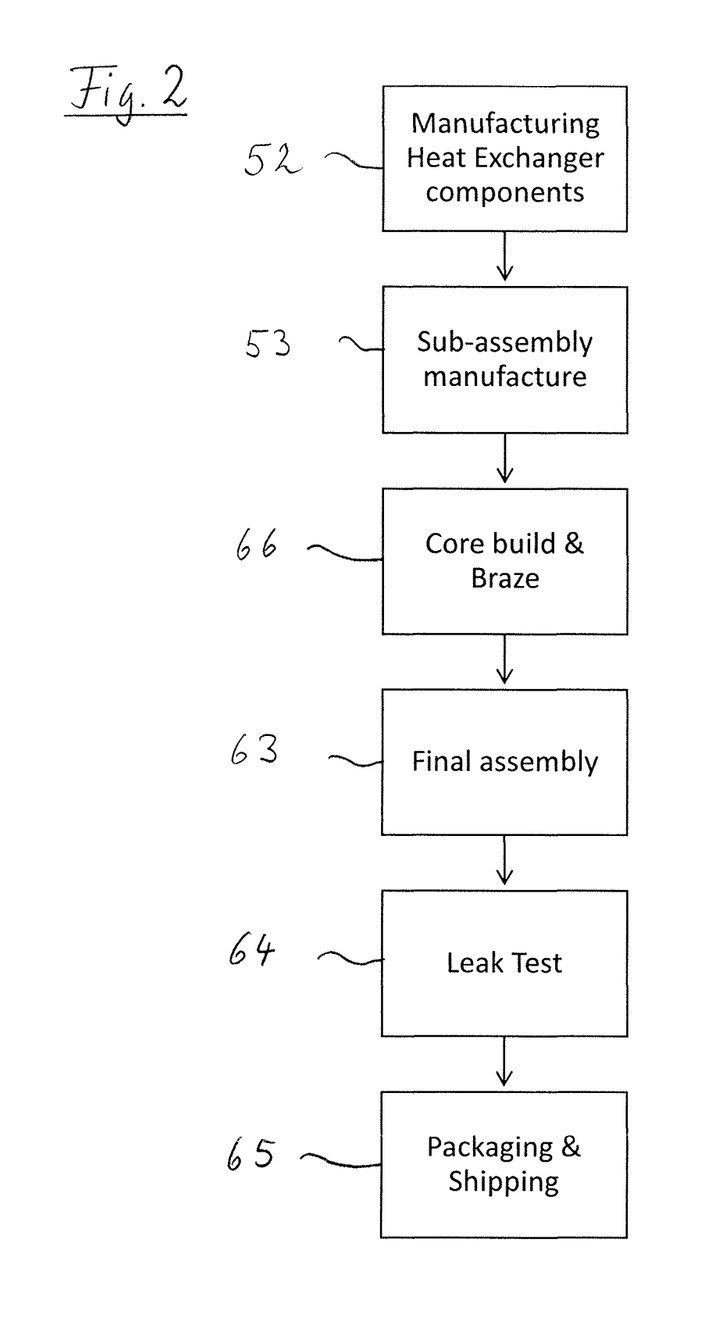
FIG. 2 shows a method for manufacturing brazed heat exchangers according to an embodiment of the invention.

An embodiment of the process according to this invention is illustrated in FIG. 2. As before, the heat exchanger components, such as tubes, fins and/or headers are manufactured in step 52, followed by sub-assembly manufacture in step 53. Then follows a new step 66, namely the combined heat exchanger core build and braze step. Here, the heat exchanger core is assembled and possibly clamped in a brazing tool arrangement adapted to form a chamber around the heat exchanger core. A localized reduced pressure or vacuum or controlled gas atmosphere is then created and heat is applied, without removing the heat exchanger core, so that it is brazed.

The brazing step is followed by final assembly 63, as before, followed by a leak test 64 and package and shipping (step 65). Accordingly, several steps, including attaching the braze frame, removing the unbrazed heat exchanger core from the core builder and transporting to the brazing furnace used in the prior at, are now omitted or avoided, allowing a fully continuous production.

Figure 3:
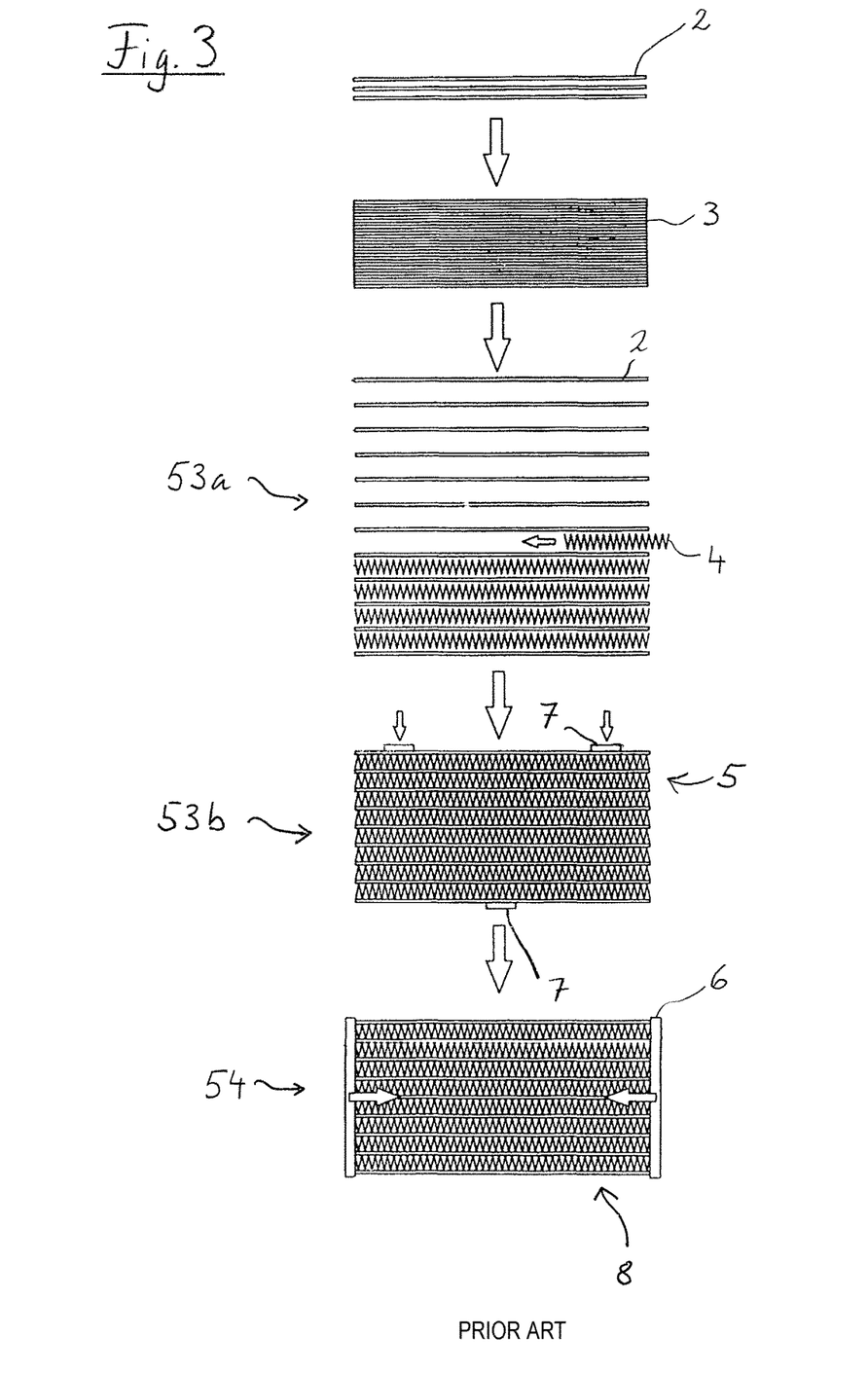
FIG. 3 schematically illustrates an exemplary core building process formed by a core building machine.

FIG. 3 illustrates an embodiment of how a core builder machine assembles in part a heat exchanger core from tubes 2, fins 4 and headers 6.

A number of individual tubes 2 are stacked to form a tube stack 3. As part of the sub-assembly manufacture (step 53a), the tubes 2 are indexed so that the tubes are spaced apart from each other. A fin insertion mechanism is then provided for inserting the fins 4 between adjacent spaced tubes 2. A fin/tube compression device 7 is provided for compressing the fins, so that tubes and fins form an intermediate assembly or sub-assembly 5 (step 53b) of a controlled geometry and dimensional tolerance. In step 54, the headers, manifold tubes and side supports members 6 are attached to form an unbrazed heat exchanger core 8. In a traditional core builder, a braze clamp is attached to this core 8 and it is removed from the core builder machine and transferred to further processing equipment, in particular a brazing furnace.

At this step it is also possible to complete the heat exchanger assembly process by mechanical techniques, i.e. to physically expand the tubes through the fin and header arrangement, to produce a so called 'mechanically assembled heat exchanger' core. This build format could also be applied to this inventive method, with an embodiment that uses heated tooling, i.e. induction heating, and a controlled atmosphere, to join (e.g. by brazing or soldering) local critical surfaces for heat transfer and leak tightness.

Figure 4:
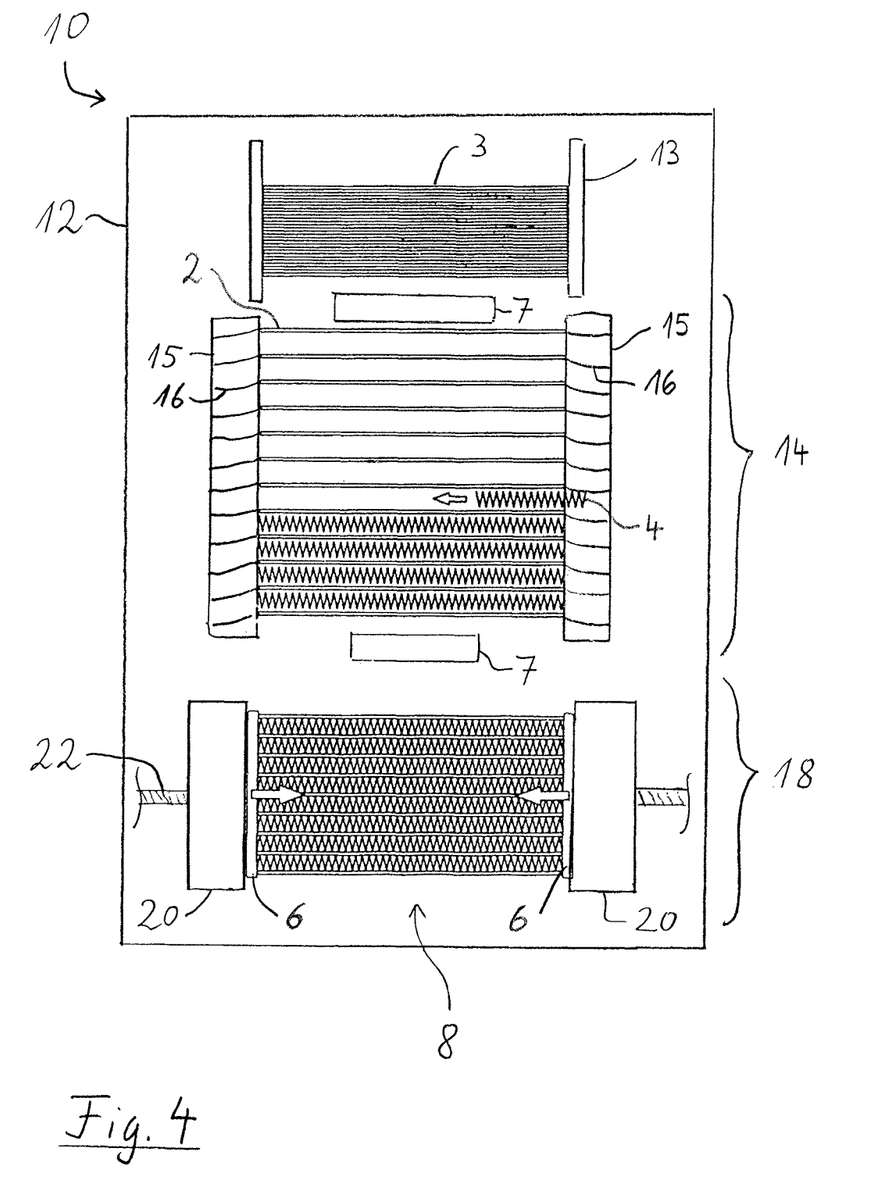
FIG. 4 is a schematic top view onto a core builder machine.

FIG. 4 further illustrates an embodiment of a core builder machine 10 according to this invention. Typically, such apparatus is mounted on a table 12. The stack of tubes 3 is provided in the tube magazine or hopper 13. Each tube 2 is dispensed onto the table 12 into a tube indexing device, which includes a pair of counter-rotating augers, geared wheels or belt devices 15 located on each lateral side of the elongated table 12. Each auger has a helical groove or spacing 16 formed in their respective surfaces for receiving the tubes 2 dispensed from a tube dispenser assembly, and for spacing the tubes 2 apart from each other. This allows insertion of fins 4. Once the fins 4 have been inserted, the fin/tube positioning and compression mechanism 7 acts to form an intermediate assembly or sub-assembly. This sub-assembly 5 is transferred to the core assembly or header attachment section 18. Here, headers 6 or similar are attached and the header presses 20 are advanced in the direction of the arrows to press the headers 6 or similar into place on the ends of the tubes. These presses 20 may be advanced by a drive mechanism 22. Accordingly, a heat exchanger core 8 is formed. Tubes and fins can also be built up and/or inserted by hand if required.

Figure 5:
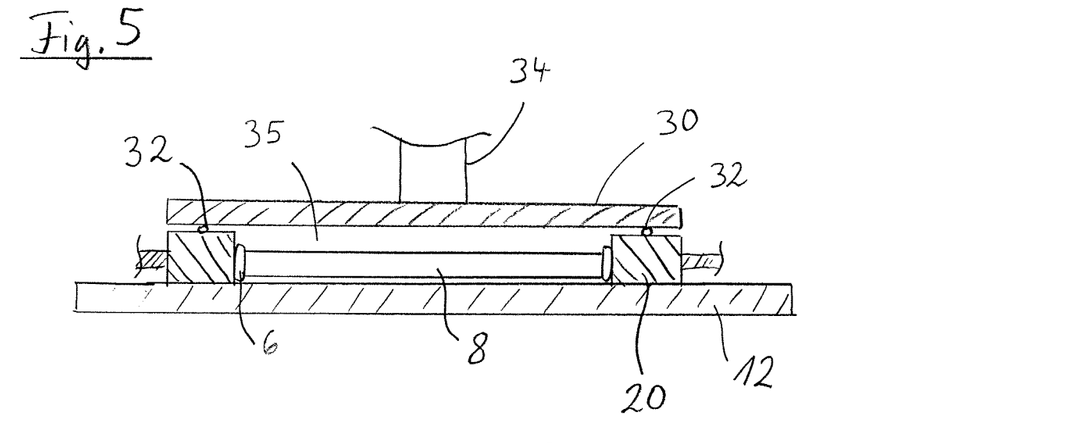
FIG. 5 is a schematic cross-section through the brazing tool arrangement forming the chamber around the heat exchanger core of a core builder machine according to a first embodiment of the invention.
Figure 6:
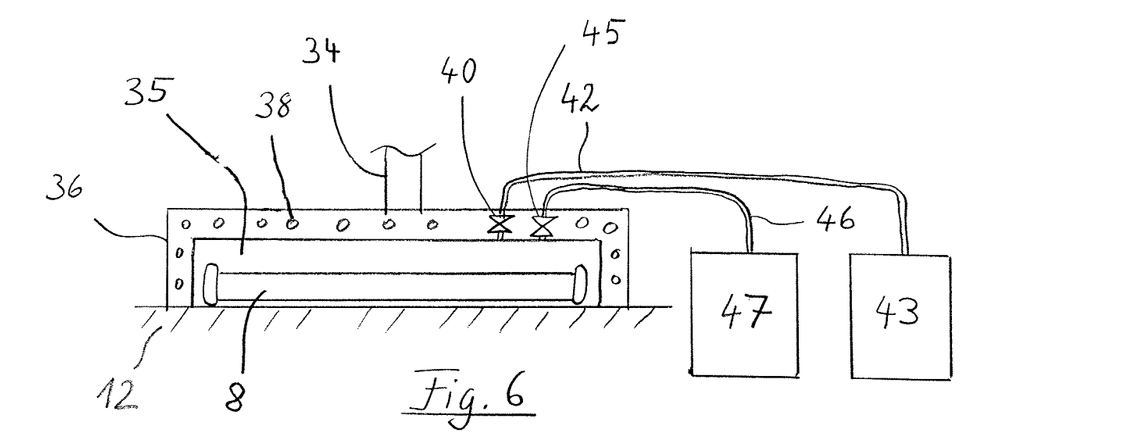
FIG. 6 is a schematic cross-section through the brazing tool arrangement creating the chamber around the heat exchanger core of a core builder machine according to a second embodiment of the invention.
Figure 7:
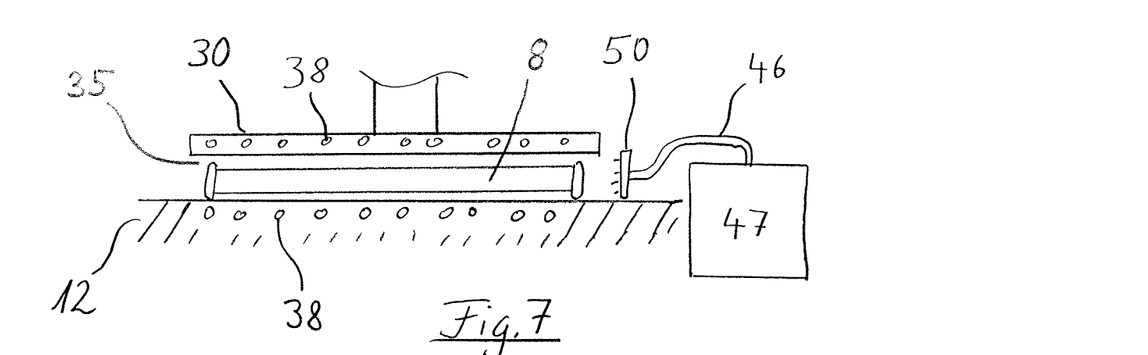
FIG. 7 is a schematic cross-section through the brazing tool arrangement creating the chamber around the heat exchanger core of a core builder machine according to a third embodiment of the invention.

In the next step illustrated in FIGS. 5 to 7, the heat exchanger core 8 is brazed. In the embodiment illustrated in cross-section in FIG. 5, the presses 20 remain in place and possibly even in contact with the headers 6. However, a brazing tool arrangement in the form of a plate 30 is lowered from above through a holding mechanism 34, e.g. a rotatable mechanism, and lowered adjacent to the presses 20 to form a closed chamber or enclosure 35 around the heat exchanger core 8. Suitable sealing 32 is preferably supplied between different parts of the brazing tool arrangement 30, 20 forming the enclosure. The front wall of the chamber 35 may be formed by another part of the brazing tool arrangement (not shown) and all openings may be provided with suitable sealing.

Thereby, a chamber or enclosure 35 is formed by the brazing tool arrangement around the heat exchanger core 8. To braze the heat exchanger core, only a localized heating and possibly localized vacuum or controlled gas atmosphere is applied to the chamber 35. An example of suitable equipment thereof is shown in FIG. 6.

In this embodiment, the chamber 35 around the heat exchanger core 8 is formed by a one-piece brazing tool arrangement 36 in the shape of a hood or platen 36, which may be lowered onto the table 12 from above. The space between hood 36 and table 12 may be suitably sealed. In order to be able to apply a reduced pressure or vacuum to the chamber 35, a vacuum valve 40 is provided in the hood (or adjacent assembly), which is connected through vacuum tubing 42 with a vacuum pump 43 or pumps. In some embodiments, a separate/additional pump (not shown) is connected to the chamber and may be used to remove any brazing fumes and/or the evaporated lubricant from the enclosure 35, via a suitable filtration system. In addition or alternatively, chamber 35 may be connected with an inert gas supply system 47 through valve 45 and tube 46, and/or a reactive gas supply (not shown). Thereby, the chamber/enclosure 35 may be filled with a localized controlled gas atmosphere containing an inert gas, at least up to a partial overpressure above local atmospheric pressure, for brazing. The required heat for the brazing operation may be generated by induction coils 38 inside the brazing tool hood 36, table 12 and tooling 20. Alternatively or additionally, an infrared heater or a convection heater or an electrical heater or combination thereof may be present.

FIG. 7 shows another embodiment, in which the chamber 35 is not sealed, but open. It is formed by lowering a plate 30 or other type of brazing tool arrangement on top of the heat exchanger core 8. However, the sides are still open, thereby defining a space 35 open to the sides (an open chamber), which may be temporarily filled with inert gas by creating a controlled gas flow from gas supply 47 through tube 46 and nozzle 50. Extraction is not shown. In this way, the critical elements of the heat exchanger core 8 may be at least partially immersed in flowing inert gas such as nitrogen or argon or similar, to create a local controlled gas atmosphere for the brazing operation. In addition, a device for removing any brazing fumes may be present (not shown). The heat required for the brazing operation is provided through induction coils 38, which in this case are positioned both in the brazing tool plate 30 and in the table 12, and in the side tooling 20, to thereby create a localized heated environment in the chamber 35.

The invention is not limited to the embodiments described before, which may be varied widely within the scope of the invention as defined by the appending claims.

LIST OF REFERENCE SIGNS

2 tubes
3 tube stack
4 fins
5 intermediate core assembly
6 headers or tube carriers or similar
7 fin/tube compression device
8 heat exchanger core
10 core builder machine
12 table/machine bed
13 tube magazine
14 intermediate assembly
15 pair of counter-rotating augers, geared wheels or belt devices
16 helical groove or spacing
18 header attachment
20 header press tooling
22 header drive mechanism
30 brazing tool plate
32 sealing
34 holding mechanism
35 chamber
36 brazing tool arrangement/hood
38 induction coils
40 vacuum valve(s)
42 vacuum tubing
43 vacuum pump system
45 inert gas valve(s)
46 tubing
50 nozzle arrangement
47 inert gas supply system
52-65 process steps
66 combined heat exchanger core build and braze step

The invention claimed is:

1. A method of manufacturing at least one brazed heat exchanger, comprising the steps of:
   a. providing components for a heat exchanger and providing a core builder machine comprising a table and a brazing tool arrangement;
   b. assembling the heat exchanger components to form at least one unbrazed heat exchanger core on the table of the core builder machine;
   c. moving the brazing tool arrangement relative to the table such that the brazing tool arrangement forms a chamber on the table that at least partially encloses the at least one heat exchanger core on the table of the core builder machine, the brazing tool arrangement comprising means to heat the interior of the chamber, wherein moving the brazing tool arrangement comprises advancing opposing headers or opposing side plates towards the at least one heat exchanger core on the table and lowering a top plate towards the table such that the headers or side plates and the top plate together form the chamber on the table;
   d. optionally, at least partially evacuating the chamber and/or at least partially filling the chamber with an inert and/or a reactive gas;
   e. brazing the at least one heat exchanger core in the chamber to form the at least one brazed heat exchanger on the table of the core builder machine.

2. The method according to claim 1, wherein the brazing step includes heating the at least one heat exchanger core in the chamber by inductive, radiation and/or conductive heating, optionally to a temperature in a range of about 530° C. to about 615° C., for a period long enough for melting, wetting and spreading of a filler metal or brazing material joining the components for the heat exchanger.

3. The method according to claim 1, wherein the heat exchanger components are lubricated with an evaporative lubricant prior to being assembled, and wherein the at least partial vacuum is created in the chamber prior to the brazing step, until a sufficient portion of the evaporative lubricant has evaporated.

4. The method according to claim 1, wherein the at least one heat exchanger core is not fluxed prior to brazing.

5. The method according to claim 1, wherein at least some of the heat exchanger components are manufactured from aluminium alloy brazing sheet including a core layer clad on one or both sides with a filler alloy, and wherein the core alloy is selected from an alloy belonging to the AA1xxx, AA3xxx, AA5xxx, AA6xxx, AA7xxx or AA8xxx series, and the filler alloy belongs to the AA4xxx series.

6. The method according to claim 1, wherein the brazing is carried out at temperatures between 570° C. and 610° C.

7. The method according to claim 1, wherein the cycle time for the manufacturing the at least one brazed heat exchanger is between 1 and 45 minutes.

8. The method according to claim 1, comprising a step of cooling of the at least one brazed heat exchanger after brazing.

9. The method according to claim 1, wherein the cycle time for the manufacturing the at least one brazed heat exchanger is between 5 and 25 minutes.

10. The method according to claim 1, wherein the components for the heat exchanger are selected from members of the group consisting of tubes, fins, headers, side supports/members, brackets and mounting components.

* * * * *